United States Patent
Shi

(10) Patent No.: US 11,503,435 B2
(45) Date of Patent: Nov. 15, 2022

(54) POSITIONING METHOD AND APPARATUS OF TARGET NODE IN WIRELESS AD HOC NETWORK, ELECTRONIC DEVICE, AND MEDIUM

(71) Applicant: BOE TECHNOLOGY GROUP CO., LTD., Beijing (CN)

(72) Inventor: Baoyu Shi, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 72 days.

(21) Appl. No.: 17/271,530

(22) PCT Filed: May 13, 2020

(86) PCT No.: PCT/CN2020/090037
§ 371 (c)(1),
(2) Date: Feb. 25, 2021

(87) PCT Pub. No.: WO2020/253421
PCT Pub. Date: Dec. 24, 2020

(65) Prior Publication Data
US 2021/0258735 A1    Aug. 19, 2021

(30) Foreign Application Priority Data
Jun. 19, 2019 (CN) .......................... 201910532216.5

(51) Int. Cl.
*H04W 4/029* (2018.01)
*G01S 5/06* (2006.01)
*G01S 19/01* (2010.01)

(52) U.S. Cl.
CPC .............. *H04W 4/029* (2018.02); *G01S 5/06* (2013.01); *G01S 19/01* (2013.01)

(58) Field of Classification Search
CPC ..... H04W 4/029; H04W 4/023; H04W 84/18; G01S 5/06; G01S 11/02; G01S 5/0244; G01S 5/0289; G01W 19/01
See application file for complete search history.

(56) References Cited

U.S. PATENT DOCUMENTS 7,630,792 B2   12/2009  Kim
11,019,457 B2   5/2021  Lee et al.
(Continued)

FOREIGN PATENT DOCUMENTS

CN   1637432 A     7/2005
CN   103220746 A   7/2013
(Continued)

OTHER PUBLICATIONS

Ma Qing-Gong, Liu Ran-Ran, DV—Distance Localization Algorithm for Wireless Sensor Networks, China Academic Journal Electronic Publishing House, 2001, 5 pages.
(Continued)

*Primary Examiner* — Brandon J Miller
(74) *Attorney, Agent, or Firm* — Kinney & Lange, P.A.

(57) ABSTRACT

The present disclosure provides a positioning method of a target node in a wireless ad hoc network, including: performing an initial positioning to obtain a first positioning result for the target node; determining, based on the first positioning result and a second positioning result for an other node in the wireless ad hoc network, whether a positioning error exists in the first positioning result or not, wherein the second positioning result at least contains an accurate second positioning result; and calculating a third positioning result for the target node based on the accurate second positioning result, in response to determining a positioning error exists in the first positioning result. The present disclosure further provides a positioning apparatus
(Continued)

of a target node in a wireless ad hoc network, an electronic device, and a storage medium.

13 Claims, 5 Drawing Sheets

(56) References Cited

U.S. PATENT DOCUMENTS

| | | | | |
|---|---|---|---|---|
| 2010/0329123 A1* | 12/2010 | Viswanathan | ........ | H04W 24/00 707/769 |
| 2016/0183049 A1 | 6/2016 | Rotstein | | |
| 2017/0265042 A1 | 9/2017 | Choi et al. | | |

FOREIGN PATENT DOCUMENTS

| | | | | |
|---|---|---|---|---|
| CN | 103619062 A | 3/2014 | | |
| CN | 104602339 A | 5/2015 | | |
| CN | 106792976 A | 5/2017 | | |
| CN | 108174443 A | 6/2018 | | |
| CN | 108459298 A | 8/2018 | | |
| CN | 110225451 A | 9/2019 | | |
| EP | 1617601 A2 * | 1/2006 | ........... | G01S 5/0289 |
| WO | 2013006028 A1 | 1/2013 | | |
| WO | 2019066554 A1 | 4/2019 | | |

OTHER PUBLICATIONS

First Chinese Office Action dated Jun. 29, 2021, received for corresponding Chinese Application No. 201910532216.5, 11 pages.

* cited by examiner

POSITIONING METHOD AND APPARATUS OF TARGET NODE IN WIRELESS AD HOC NETWORK, ELECTRONIC DEVICE, AND MEDIUM

CROSS-REFERENCE TO RELATED APPLICATION

This application is a Section 371 National Stage Application of International Application No. PCT/CN2020/090037, which claims priority to the Chinese Patent Application No. 201910532216.5, filed on Jun. 19, 2019 and entitled "POSITIONING METHOD AND APPARATUS OF TARGET NODE IN WIRELESS AD HOC NETWORK, ELECTRONIC DEVICE, AND MEDIUM", the disclosures of which are incorporated herein by reference in its entirety.

TECHNICAL FIELD

The present disclosure relates to a field of data processing technology, and in particular to a positioning method and apparatus of a target node in a wireless ad hoc network, an electronic device, and a non-transitory medium.

BACKGROUND

GPS (global positioning system) is a high-precision navigation and positioning system but has a limited anti-jamming ability.

SUMMARY

In view of this, the objective of the embodiments of the present disclosure is to propose a positioning method and apparatus of a target node in a wireless ad hoc network, an electronic device, and a non-transitory medium.

Based on the above objective, a first aspect of the embodiments of the present disclosure proposes a positioning method of a target node in a wireless ad hoc network, including: performing an initial positioning to obtain a first positioning result for the target node; determining, based on the first positioning result and a second positioning result for an other node in the wireless ad hoc network, whether a positioning error exists in the first positioning result or not, wherein the second positioning result at least contains an accurate second positioning result; and calculating a third positioning result for the target node based on the accurate second positioning result, in response to determining a positioning error exists in the first positioning result.

For example, the calculating a third positioning result for the target node based on the accurate second positioning result includes: measuring a first distance, wherein the first distance is a point-to-point distance between the target node and an other node in the wireless ad hoc network; receiving, from the other node, a cumulative hop distance of a minimum hop path between the other node and an anchor node, wherein the anchor node is a node associated with the accurate second positioning result; deriving a second distance between the target node and the anchor node based on the first distance and the cumulative hop distance of the minimum hop path between the other node and the anchor node, wherein the second distance is a cumulative hop distance of a minimum hop path between the target node and the anchor node; and calculating a third positioning result for the target node based on at least two second distances to at least two anchor nodes and second positioning results for the at least two anchor nodes.

For example, the calculating a third positioning result for the target node based on at least two second distances to at least two anchor nodes and second positioning results for the at least two anchor nodes includes: approximating the second distance to a respective Euclidean distance between the target node and the anchor node, so as to calculate the third positioning result for the target node.

For example, the calculating the third positioning result includes: calculating the third positioning result by using a trilateration method or a maximum likelihood method.

For example, the measuring a first distance includes: measuring the first distance by using a received signal strength indication method.

For example, in the positioning method of the target node in the wireless ad hoc network, the cumulative hop distance is propagated by the other node using a distance vector routing method.

For example, the determining, based on the first positioning result and a second positioning result for an other node in the wireless ad hoc network, whether a positioning error exists in the first positioning result or not includes: transmitting a wireless signal at a first transmission power to determine a first node communicable with the target node; transmitting a wireless signal at a second transmission power to determine a second node communicable with the target node, wherein a communication range of the second transmission power is different from a communication range of the first transmission power; determining a third distance between the target node and the first node as well as a fourth distance between the target node and the second node, based on the communication range of the first transmission power and the communication range of the second transmission power; and determining, based on the third distance, the fourth distance, the first positioning result, the second positioning result for the first node, and the second positioning result for the second node, whether a positioning error exists in the first positioning result or not.

For example, the performing an initial positioning to obtain a first positioning result for the target node includes: performing the initial positioning by using a GPS positioning method to obtain the first positioning result for the target node.

A second aspect of the embodiments of the present disclosure proposes a positioning apparatus of a target node in a wireless ad hoc network, including: an initial positioning module configured to perform an initial positioning to obtain a first positioning result for the target node; a positioning error determination module configured to determine, based on the first positioning result and a second positioning result for an other node in the wireless ad hoc network, whether a positioning error exists in the first positioning result or not, wherein the second positioning result at least contains an accurate second positioning result; and a positioning error correction module configured to calculate a third positioning result for the target node based on the accurate second positioning result, in response to determining a positioning error exists in the first positioning result.

For example, the positioning error correction module is further configured to: measure a first distance, wherein the first distance is a point-to-point distance between the target node and the other node in the wireless ad hoc network; receive, from the other node, a cumulative hop distance of a minimum hop path between the other node and an anchor node, wherein the anchor node is a node associated with the accurate second positioning result; derive a second distance between the target node and the anchor node based on the first distance and the cumulative hop distance of the minimum hop path between the other node and the anchor node, wherein the second distance is a cumulative hop distance of a minimum hop path between the target node and the anchor node; and calculate a third positioning result for the target node based on at least two second distances to at least two anchor nodes and second positioning results for the at least two anchor nodes.

For example, the positioning error determination module is further configured to: transmit a wireless signal at a first transmission power to determine a first node communicable with the target node; transmit a wireless signal at a second transmission power to determine a second node communicable with the target node, wherein a communication range of the second transmission power is different from a communication range of the first transmission power; determine a third distance between the target node and the first node as well as a fourth distance between the target node and the second node, based on the communication range of the first transmission power and the communication range of the second transmission power; and determine, based on the third distance, the fourth distance, the first positioning result, the second positioning result for the first node, and the second positioning result for the second node, whether a positioning error exists in the first positioning result or not.

A third aspect of the embodiments of the present disclosure proposes an electronic device, including: at least one processor; and a memory communicatively connected to the at least one processor, wherein the memory stores instructions executable by the at least one processor, and the instructions, when executed by the at least one processor, cause the at least one processor to implement the method described above.

A fourth aspect of the embodiments of the present disclosure proposes a non-transitory computer-readable storage medium having a computer program stored thereon, wherein the computer program, when executed by a processor, implements steps of the method described above.

BRIEF DESCRIPTION OF THE DRAWINGS

In order to more clearly explain the technical solutions in the embodiments of the present disclosure, the drawings of the embodiments will be briefly introduced below. Obviously, the drawings in the following description are only some embodiments of the present disclosure, and are not intended to limit the present disclosure.

DETAILED DESCRIPTION OF EMBODIMENTS

In order to make the objectives, technical solutions and advantages of the present disclosure more clear, the technical solutions of the embodiments of the present disclosure are clearly and completely described below with reference to the drawings of the embodiments of the present disclosure. Obviously, the described embodiments are only a part but not all of the embodiments of the present disclosure. Based on the embodiments of the present disclosure, all other embodiments obtained by persons of ordinary skill in the art without carrying out creative work fall within the protection scope of the present disclosure.

Unless otherwise defined, technical terms or scientific terms used in the present disclosure shall be of the general meaning understood by the ordinary skilled in the art. The words "first," "second," and the like used in the present disclosure do not denote any order, quantity or importance, but are used to distinguish different components. Similarly, words such as "a", "one" or "the" do not mean a limit in quantity, but mean at least one. The words "comprising," "including" and the like indicate that the element or item preceding the word contains the elements or items listed following the word as well as the equivalents, but do not exclude other elements or items. The words "connected," "coupled," or the like are not limited to physical or mechanical connections, but may include electrical connections, whether direct or indirect. The words "upper", "lower", "left", "right" and the like are only used to indicate relative positional relationship, and when the absolute position of the object described is changed, the relative positional relationship may also be correspondingly changed.

Figure 1:
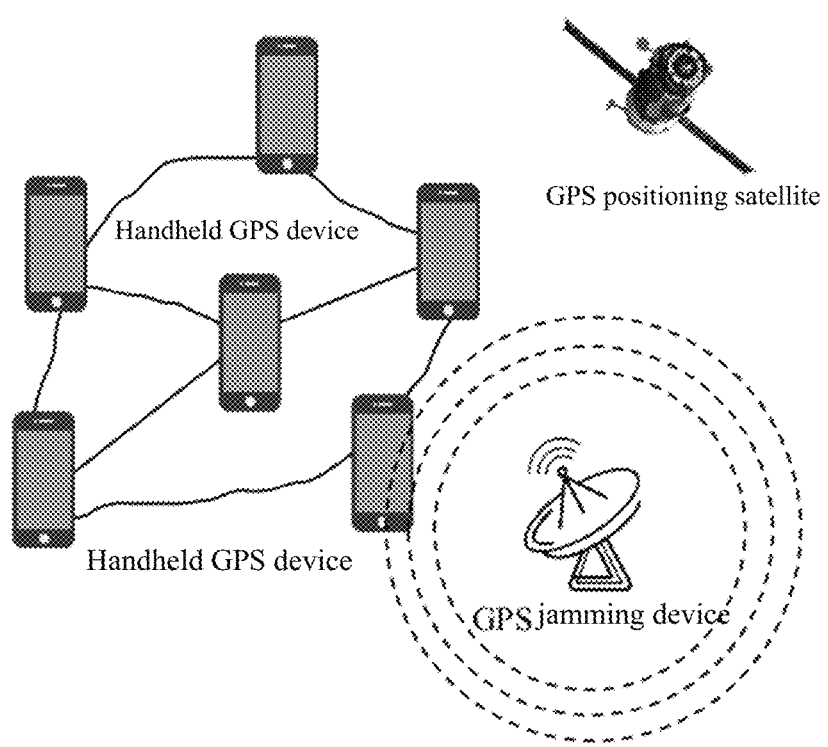
FIG. 1 shows a schematic diagram of a GPS positioning method.

FIG. 1 shows a schematic diagram of a GPS positioning method. As shown in FIG. 1, due to a presence of interference, positioning results for nodes obtained by the GPS positioning method may have different positioning errors, and the positioning errors for some seriously interfered nodes are very large.

In a first aspect of the embodiments of the present disclosure, there is proposed a positioning method of a target node in a wireless ad hoc network, which may solve the problem of an inaccurate positioning result for a node to a certain extent.

Figure 2:
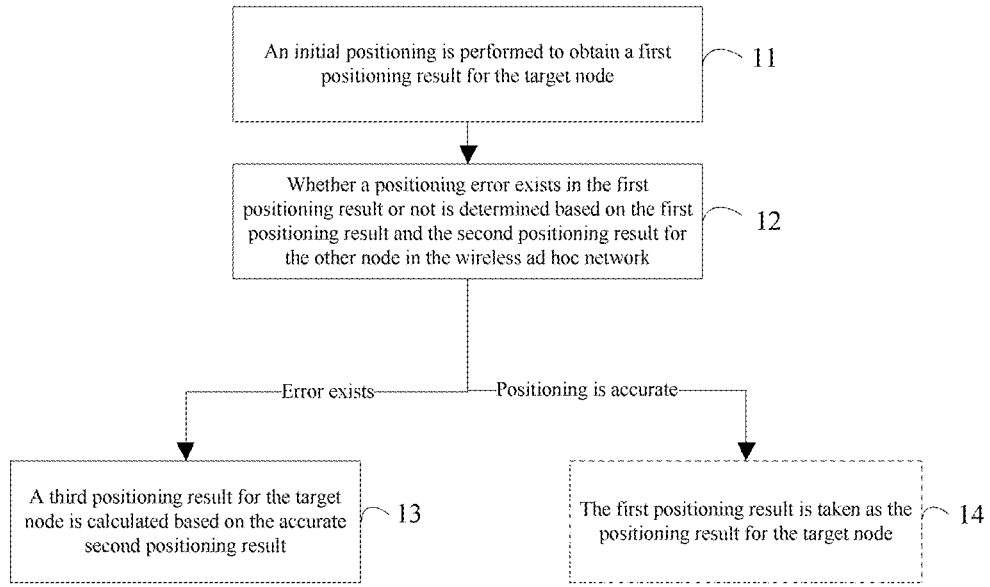
FIG. 2 shows a schematic flowchart of a positioning method of a target node in a wireless ad hoc network provided by an embodiment of the present disclosure.

As shown in FIG. 2, the positioning method of the target node in the wireless ad hoc network is optionally applied to the target node to be positioned. The positioning method may include the following steps.

In step 11, an initial positioning is performed to obtain a first positioning result for the target node.

For example, the initial positioning may be performed by a positioning module provided in the target node, for example, a GPS positioning module provided in the target node.

For example, all nodes in the wireless ad hoc network may perform the initial positioning by using their own positioning modules, and these initial positioning results may be propagated and exchanged among all nodes in the wireless ad hoc network.

In this embodiment, in order to distinguish an initial positioning result for the target node from an initial positioning result for an other node in the wireless ad hoc network, the initial positioning result for the target node is referred to as a first positioning result, and the initial positioning result for the other node in the wireless ad hoc network is referred to as a second positioning result. The target node may receive the initial positioning result for the other node (the second positioning result) from the other node.

For example, the performing an initial positioning to obtain a first positioning result for the target node includes: performing the initial positioning by using a GPS positioning method to obtain the first positioning result for the target node.

Certainly, in addition to the GPS positioning method, those skilled in the art may also use other common positioning methods to perform the initial positioning, which will not be repeated here.

In step 12, whether a positioning error exists in the first positioning result or not is determined based on the first positioning result and the second positioning result for the other node in the wireless ad hoc network. The second positioning result may contain an accurate second positioning result and a second positioning result with a positioning error.

Due to external interference, there may be an error in the initial positioning result for the node (for example, the first positioning result). However, whether an error exists in the initial positioning result may not be determined based on the initial positioning result only. Therefore, it is necessary to use a mutual coordination between various nodes in the wireless ad hoc network to recognize the error in the initial positioning result.

The wireless ad hoc network has strong anti-destroy ability. Even if some nodes are disturbed or even eliminated, the network may operate normally. The wireless ad hoc network is also a cooperative network, and nodes in the network may cooperate with each other through communication. Therefore, an interference correction of the GPS positioning may be made through the wireless ad hoc network, thereby improving the positioning accuracy.

Figure 3A:
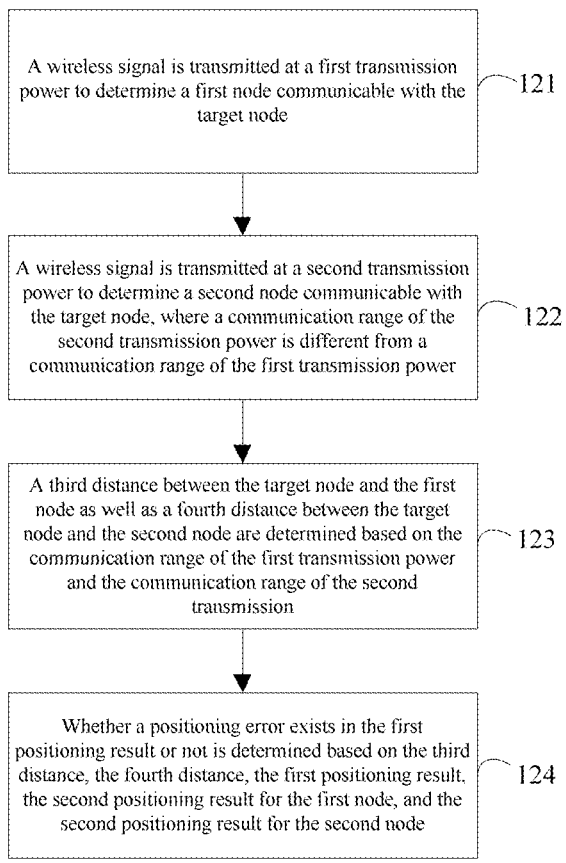
FIG. 3A shows a schematic flowchart of determining whether a positioning error exists in the first positioning result or not in an embodiment of the present disclosure.

For example, as shown in FIG. 3A, the determining, based on the first positioning result and a second positioning result for the other node in the wireless ad hoc network, whether a positioning error exists in the first positioning result or not may further include the following steps.

In step 121, a wireless signal is transmitted at a first transmission power to determine a first node communicable with the target node.

In step 122, a wireless signal is transmitted at a second transmission power to determine a second node communicable with the target node. A communication range of the second transmission power is different from a communication range of the first transmission power.

In step 123, a third distance between the target node and the first node as well as a fourth distance between the target node and the second node are determined based on the communication range of the first transmission power and the communication range of the second transmission power.

In step 124, whether a positioning error exists in the first positioning result or not is determined based on the third distance, the fourth distance, the first positioning result, the second positioning result for the first node, and the second positioning result for the second node.

Figure 3B:
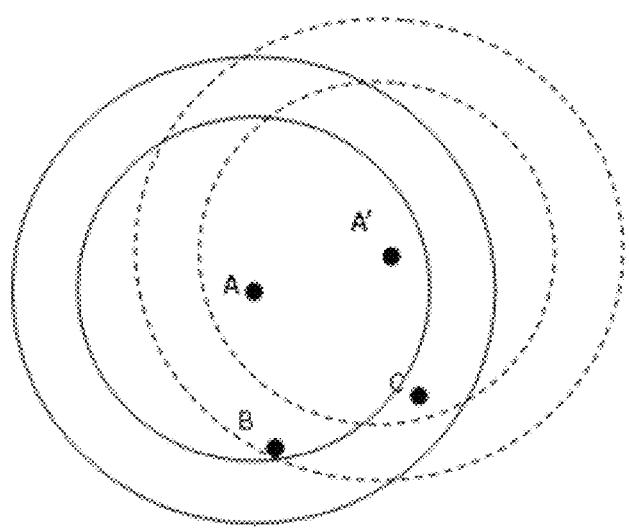
FIG. 3B shows a schematic diagram of a node relationship in determining whether a positioning error exists in the first positioning result or not in an embodiment of the present disclosure.

For example, as shown in FIG. 3B, assuming that the first transmission power is less than the second transmission power, when a target node A transmits a wireless signal at the first transmission power, only a node B may communicate with the target node A because the communication range of the first transmission power is smaller. The node B is referred to as a first node. When the target node A transmits a wireless signal at the second transmission power, both the node B and a node C may communicate with the target node A because the communication range of the second transmission power is larger. The node C is referred to as a second node. Because the node C may communicate with the target node A only when the communication range is larger, it may be determined that a distance between the node C and the target node A is greater than a distance between the node B and the target node A, and a difference between a fourth distance from the node C to the target node A and a third distance from the node B to the target node A is within a certain range (for example, a difference between a transmission radius of the first transmission power and that of the second transmission power). Next, a distance from an initial positioning result A' for the target node A to the node B and a distance from the initial positioning result A' to the node C are calculated based on the initial positioning result A' and the initial positioning results for the nodes B and C (for example, the second positioning result). If the distance from the initial positioning result A' to the node B is greater than the distance from the initial positioning result A' to the node C, or the distance from the initial positioning result A' to the node B is less than the distance from the initial positioning result A' to the node C but a difference between the distances exceeds a certain range (for example, the difference between the transmission radius of the first transmission power and the transmission radius of the second transmission power), it indicates that the initial positioning result A' may have a great error and needs to be corrected.

In this embodiment, the distance from the target node to the first node and the distance from the target node to the second node are determined by communication at transmission powers of different communication ranges, and then whether the first positioning result for the target node is accurate or not is determined based on the initial positioning result for each node.

It should be noted that this embodiment requires that the reference nodes B and C have high initial positioning accuracy, but the initial positioning generally may not be absolutely accurate. When the initial positioning result is the GPS positioning result, considering that GPS jamming has a certain regionality, this embodiment may select multiple reference nodes to jointly determine the positioning error for the target node. That is, a multi-node joint error determination scheme is adopted to avoid the problem of inaccurate positioning data for a single reference node.

In step 13, a third positioning result for the target node is calculated based on the accurate second positioning result, in response to determining a positioning error exists in the first positioning result. Here, the third positioning result calculated is an accurate positioning result for the target node.

Figure 4A:
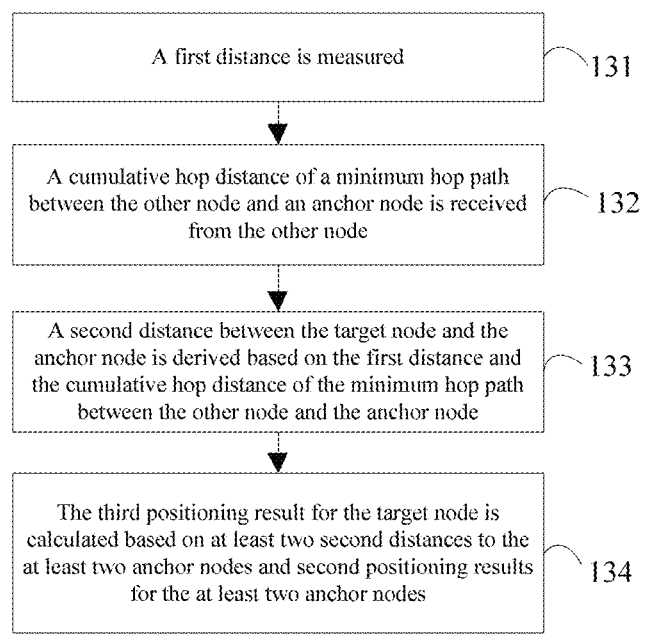
FIG. 4A shows a schematic flowchart of calculating a third positioning result for the target node based on an accurate second positioning result in an embodiment of the present disclosure.

For example, as shown in FIG. 4A, the calculating a third positioning result for the target node based on the accurate second positioning result may further include the following steps.

In step 131, a first distance is measured.

For example, each node in the wireless ad hoc network respectively calculates a point-to-point distance between the each node and the other node in the network. Here, the first distance is the point-to-point distance between the target node and the other node in the wireless ad hoc network.

For example, the measuring a first distance includes: measuring the first distance by using a received signal strength indication method.

Figure 4B:
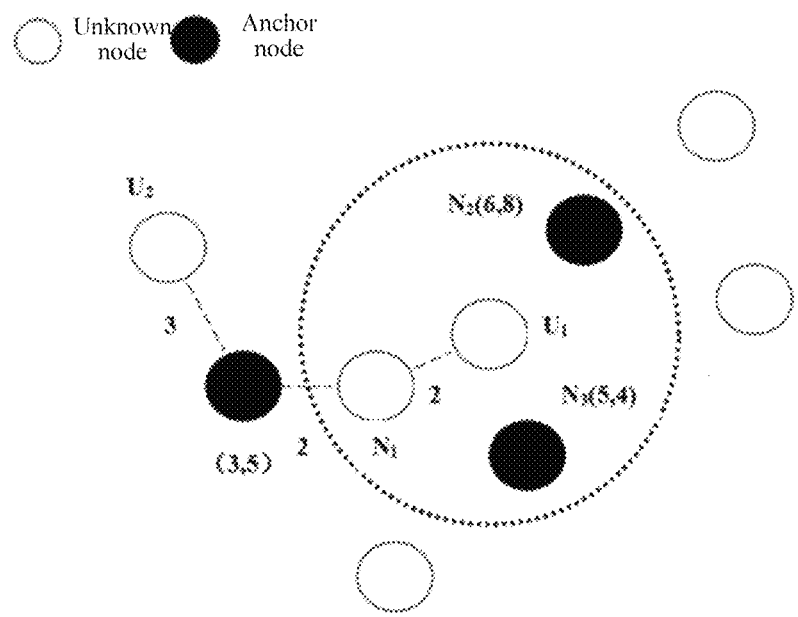
FIG. 4B shows a schematic diagram of a positional relationship between nodes in the wireless ad hoc network according to an embodiment of the present disclosure.

In step 132, a cumulative hop distance of a minimum hop path between the other node and an anchor node is received from the other node. The anchor node is a node associated with the accurate second positioning result. Optionally, the anchor node may be determined by the method in the step 12 described above. For example, each node in the wireless ad hoc network may determine whether its initial positioning result is accurate or not by the method in the step 12 described above. When some nodes determine that their initial positioning results are accurate, information indicating that the initial positioning results are accurate is broadcast in the wireless ad hoc network. After receiving the information, the other node may use the nodes associated with the accurate initial positioning results as anchor nodes, and use the relevant information of the anchor nodes to correct its initial positioning result. As shown in FIG. 4B, nodes N2 and N3 are anchor nodes, which occupy a small proportion in the network. The nodes other than the anchor nodes, such as nodes U1, U2, N1, etc., are unknown nodes, and their initial positioning results need to be corrected.

For example, in the positioning method of the target node in the wireless ad hoc network, the cumulative hop distance is propagated by the other node using a distance vector routing method. The distance vector routing method is introduced as follows.

For example, the anchor node periodically broadcasts its own position beacon containing hop numbers and the cumulative hop distance (both are initialized to 0) to the wireless ad hoc network. The hop distance mentioned here is a point-to-point distance between nodes. In addition to the first distance in the step 131, the other nodes in the wireless ad hoc network may also calculate their respective point-to-point distances to another node, which are accumulated when propagating the cumulative hop distance.

The node that receives the beacon only records information of the anchor node transmitted from the minimum hop path, and accumulates all hop distances in the minimum hop path. Then, the node adds 1 to the hop number and forwards the beacon.

Finally, each node in the wireless ad hoc network may respectively obtain the cumulative hop distance of the minimum hop path from the each node to the corresponding anchor node.

Figure 4C:
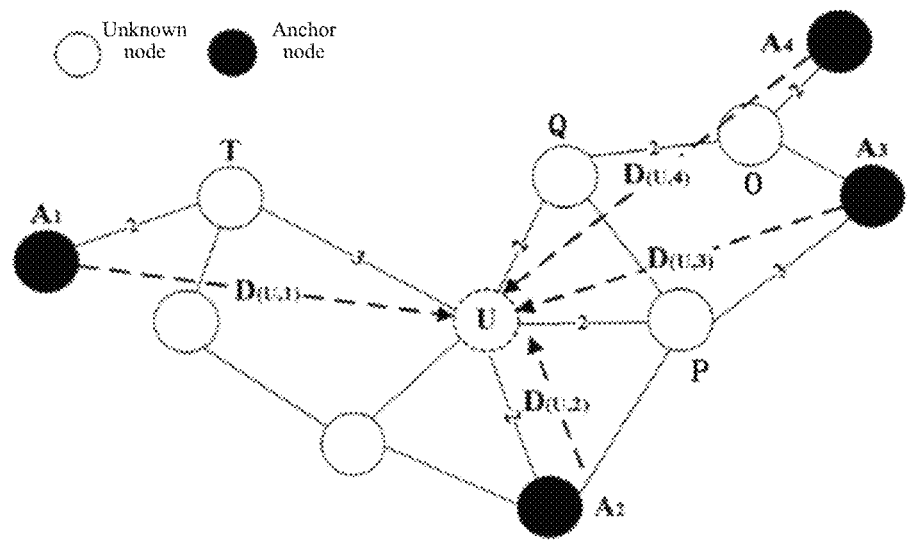
FIG. 4C shows a schematic process diagram of data transmission between nodes in the wireless ad hoc network in an embodiment of the present disclosure.

As shown in FIG. 4C, each of anchor nodes A1, A2, A3, A4 may transmit an information packet containing its own information to an unknown node U by using the wireless ad hoc network. Communication between the unknown node U and the anchor node A1 may pass through another unknown node T. When the anchor node A1 transmits the information packet to the intermediate node T, the intermediate node T may know a distance from the intermediate node T to the anchor node A1. When the intermediate node T forwards the information packet of the anchor node A1 to the unknown node U, the distance from the intermediate node T to the anchor node A1 is accumulated on the cumulative hop distance variable. Therefore, when the unknown node U receives the information packet forwarded, it may obtain a distance between U and A1 by adding the distance between the unknown node U and the intermediate node T to the cumulative hop distance variable received.

For example, the cumulative hop distance from A1 to U in FIG. 4C is 2+3=5. Similarly, it may be obtained that the cumulative hop distances from the other anchor nodes A2, A3, A4 to the unknown node are 2, 2+3, 2+2+2, respectively. The above numbers are respective hop distances between the corresponding nodes.

In step 133. The second distance is a cumulative hop distance of a minimum hop path between the target node and the anchor node.

In the step 132, the target node receives the cumulative hop distance of the minimum hop path between the other node and the anchor node, and then adds the point-to-point distance between the target node and the other node, thereby obtaining the cumulative hop distance between the target node and the anchor node. Next, one of these cumulative hop distances corresponding to the minimum hop path is taken as the cumulative hop distance of the minimum hop path between the target node and the corresponding anchor node, and then as the second distance between the target node and the anchor node to calculate the third positioning result.

For example, the second distance is approximated to a respective Euclidean distance between the target node and the anchor node.

For example, as shown in FIG. 4C, approximate Euclidean distances between the unknown node U and the anchor nodes A1, A2, A3, A4 are respectively expressed as: D(U, 1)=2+3, that is, the distance from the anchor node A1 to the intermediate node T plus the hop distance from the intermediate node T to the target node U; D(U, 2)=2, that is, the hop distance from the anchor node A2 to the target node U; D(U, 3)=3+2, that is, the hop distance from the anchor node A3 to an intermediate node P plus the hop distance from intermediate node P to the target node U; D(U, 4)=2+2+2, that is, the hop distance from the anchor node A4 to an intermediate node O plus the hop distance from the intermediate node O to an intermediate node Q plus the hop distance from the intermediate node Q to the target node U. Then, a system of equations may be established to solve a position of the unknown node U.

In this way, for example, the calculating a third positioning result for the target node based on at least two second distances to at least two anchor nodes and second positioning results for the at least two anchor nodes may include: approximating the second distance to a respective Euclidean distance between the target node and the anchor node, so as to calculate the third positioning result for the target node.

In step 134, the third positioning result for the target node is calculated based on at least two second distances to the at least two anchor nodes and second positioning results for the at least two anchor nodes.

For example, the calculating the third positioning result includes: calculating the third positioning result by using a trilateration method or a maximum likelihood method.

For example, suppose coordinates of the anchor nodes are respectively A1 ($a_1$, $b_1$), A2 ($a_2$, $b_2$), A3 ($a_3$, $b_3$), A4 ($a_4$, $b_4$), and U (x, y) is to be solved, where $(x-a_1)^2+(y-b_1)^2=5^2$, $(x-a_2)^2+(y-b_2)^2=2^2$, $(x-a_3)^2+(y-b_3)^2=5^2$, $(x-a_4)^2+(y-b_4)^2=6^2$.

In this way, x and y may be solved, and then the third positioning result for the target node may be obtained.

Therefore, the coordinates of the target node may be obtained when two cumulative hop distances of the minimum hop paths between the target node and two anchor nodes are known. When more than two cumulative hop distances of the minimum hop paths are known, calibration processing such as averaging may be performed on the calculated x and y values. The specific method may be designed according to needs, and will not be repeated here.

In this embodiment, by measuring the first distance and receiving the cumulative hop distance of the minimum hop path between the other node and the anchor node, the second distance between the target node and the anchor node is derived based on the cumulative hop distance of the minimum hop path, and the third positioning result for the anchor node is finally calculated based on the second positioning result for the anchor node. In this way, the positioning result for the target node is recalculated by using the wireless ad hoc network and the anchor nodes that are accurately positioned, which improves the positioning accuracy.

This embodiment improves the survivability of all blind nodes by using the advantages of multi-hop communication and anti-attack ability of the ad hoc network, and improves the positioning accuracy of the blind nodes by using the cooperation between nodes. Therefore, the anti-jamming ability of the positioning method is improved by using the advantages of the ad hoc network For example, the positioning method of the target node in the wireless ad hoc network may further include step 14. In the step 14, the first positioning result is taken as the positioning result for the target node in response to determining that the first positioning result is accurate, and the positioning process may end.

According to the above embodiments, in the positioning method of the target node in the wireless ad hoc network provided by the embodiments of the present disclosure, whether an error exists in the first positioning result or not is determined based on the initial positioning result for each node. When an error exists, the positioning result is corrected by using characteristics of the wireless ad hoc network and the accurate second positioning result, thereby obtaining an accurate third positioning result. By making positioning correction using the characteristics of the wireless ad hoc network, the problem of inaccurate positioning of the node may be solved to a certain extent, and the positioning accuracy may be improved.

In a second aspect of the embodiments of the present disclosure, there is proposed a positioning apparatus of a target node in a wireless ad hoc network, which may solve the problem of inaccurate positioning of the node to a certain extent.

Figure 5:
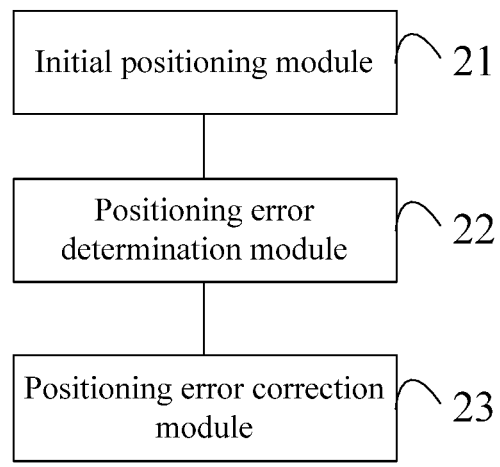
FIG. 5 shows a schematic module structural diagram of a positioning apparatus of a target node in a wireless ad hoc network provided by an embodiment of the present disclosure.

As shown in FIG. 5, the positioning apparatus of the target node in the wireless ad hoc network includes: an initial positioning module 21 configured to perform an initial positioning to obtain a first positioning result for the target node; a positioning error determination module 22 configured to determine, based on the first positioning result and a second positioning result for an other node in the wireless ad hoc network, whether a positioning error exists in the first positioning result or not, wherein the second positioning result may contain an accurate second positioning result and a second positioning result with a positioning error; a positioning error correction module 23 configured to calculate a third positioning result for the target node based on the accurate second positioning result, in response to determining a positioning error exists in the first positioning result.

According to the above embodiments, in the positioning method of the target node in the wireless ad hoc network provided by the embodiments of the present disclosure, whether an error exists in the first positioning result or not is determined based on the initial positioning result for each node. When an error exists, the positioning result is corrected by using characteristics of the wireless ad hoc network and the accurate second positioning result, thereby obtaining an accurate third positioning result. By making positioning correction using the characteristics of the wireless ad hoc network, the problem of inaccurate positioning of the node may be solved to a certain extent, and the positioning accuracy may be improved.

For example, the positioning error correction module 23 is configured to: measure a first distance, wherein the first distance is a point-to-point distance between the target node and the other node in the wireless ad hoc network; receive, from the other node, a cumulative hop distance of a minimum hop path between the other node and an anchor node, wherein the anchor node is a node associated with the accurate second positioning result; derive a second distance between the target node and the anchor node based on the first distance and the cumulative hop distance of the minimum hop path between the other node and the anchor node, wherein the second distance is a cumulative hop distance of a minimum hop path between the target node and the anchor node; calculate a third positioning result for the target node based on at least two second distances to at least two anchor nodes and second positioning results for the at least two anchor nodes.

For example, the positioning error correction module 23 is configured to measure the first distance by using a received signal strength indication method.

For example, the positioning error correction module 23 is configured to propagate the cumulative hop distance by using a distance vector routing method.

For example, the second distance is a Euclidean distance between the target node and the anchor node.

For example, the positioning error correction module 23 is configured to calculate the third positioning result by using a trilateration method or a maximum likelihood method.

For example, the positioning error determination module 22 is configured to: transmit a wireless signal at a first transmission power to determine a first node communicable with the target node; transmit a wireless signal at a second transmission power to determine a second node communicable with the target node, wherein a communication range of the second transmission power is different from a communication range of the first transmission power; determine a third distance between the target node and the first node as well as a fourth distance between the target node and the second node, based on the communication range of the first transmission power and the communication range of the second transmission power; determine, based on the third distance, the fourth distance, the first positioning result, the second positioning result for the first node, and the second positioning result for the second node, whether a positioning error exists in the first positioning result or not.

For example, the initial positioning module 21 is configured to perform the initial positioning by using a GPS positioning method to obtain the first positioning result for the target node.

The above embodiments of the positioning apparatus of the target node in the wireless ad hoc network basically correspond to the above embodiments of the positioning method of the target node in the wireless ad hoc network. Technical effects of the embodiments of the positioning apparatus of the target node in the wireless ad hoc network will not be repeated here.

Figure 6:
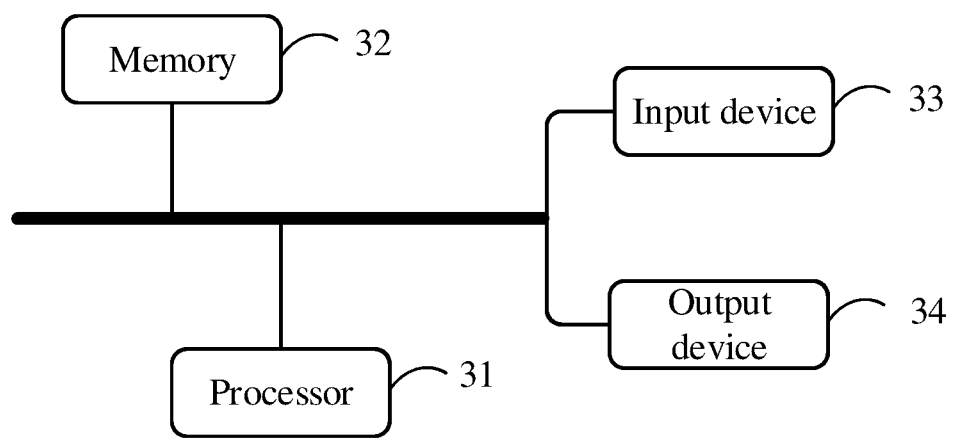
FIG. 6 shows a schematic structural diagram of a device of implementing a positioning method of a target node in a wireless ad hoc network provided by an embodiment of the present disclosure.

Based on the above objectives, the third aspect of the embodiments of the present disclosure proposes an embodiment of a device of performing the positioning method of the target node in the wireless ad hoc network. FIG. 6 shows a schematic hardware structural diagram of an embodiment of the device of performing the positioning method of the target node in the wireless ad hoc network provided by the present disclosure.

As shown in FIG. 6, the device of performing the positioning method of the target node in the wireless ad hoc network includes one or more processors 31 and a memory 32. In FIG. 6, one processor 31 is illustrated by way of example.

The device of performing the positioning method of the target node in the wireless ad hoc network may further include an input device 33 and an output device 34.

The processor 31, the memory 32, the input device 33 and the output device 34 may be connected by a bus or other methods. In FIG. 6, the connection by a bus is illustrated by way of example.

The memory 32, as a non-transitory computer-readable storage medium, may be used to store non-transitory software programs, non-transitory computer-executable programs and modules, such as program instructions/modules corresponding to the positioning method of the target node in the wireless ad hoc network in the embodiments of the present disclosure (for example, the initial positioning module 21, the positioning error determination module 22 and the positioning error correction module 23 shown in FIG. 5). The processor 31 executes various functional applications and data processing of the server by executing the non-transient software programs, instructions and modules stored in the memory 32, thereby implementing the positioning method of the target node in the wireless ad hoc network in the embodiments of the method mentioned above.

The memory 32 may include a program storage area and a data storage area. The program storage area may store an operating system and an application program required by at least one function. The data storage area may store data etc. generated by using the device according to the positioning method of the target node in the wireless ad hoc network. In addition, the memory 32 may include a high-speed random access memory, and may further include a non-transitory memory, such as at least one magnetic disk storage device, a flash memory device, or other non-transitory solid-state storage devices. In some embodiments, the memory 32 may optionally include a memory provided remotely with respect to the processor 31, and such remote memory may be connected through a network to the device of performing the positioning method of the target node in the wireless ad hoc network. Examples of the above-mentioned network include, but are not limited to the Internet, intranet, local area network, mobile communication network, and combination thereof.

The input device 33 may receive input information of numbers or character, and generate key input signals related to user settings and function control of the device of performing the positioning method of the target node in the wireless ad hoc network. The output device 1104 may include a display device such as a display screen.

One or more modules are stored in the memory 32, and when executed by the one or more processors 31, perform the positioning method of the target node in the wireless ad hoc network in any of the embodiments of the method described above. Technical effects of the embodiments of the device of performing the positioning method of the target node in the wireless ad hoc network are the same as or similar to those of any of the embodiments of the method described above.

The embodiments of the present disclosure provide a non-transitory computer storage medium having computer-executable instructions stored thereon. The computer-executable instructions may execute the processing method of the list item operation in any of the embodiments of the method described above. Technical effects of the embodiments of the non-transitory computer storage medium are the same as or similar to those of any of the embodiments of the method described above.

Finally, it should be noted that those ordinary skilled in the art may understand that all or part of the processes of the method in the embodiments described above may be implemented by a computer program instructing relevant hardware. The program may be stored in a computer readable storage medium. When the program is executed, it may include the processes of the embodiments of the method described above. The storage medium may be a magnetic disk, an optical disc, a read-only memory (ROM), or a random access memory (RAM), etc. Technical effects of the embodiments of the computer program are the same as or similar to those of any of the embodiments of the method described above.

In addition, typically, the apparatus and device described in the present disclosure may be various electronic terminal devices, such as a mobile phone, a personal digital assistants (PDA), a tablet computer (such as a PAD), a smart TV, etc., or a large-scale terminal device, such as a server. Therefore, the protection scope of the present disclosure should not be limited to a specific type of apparatus or device. In addition, the method according to the present disclosure may also be implemented as a computer program executed by a CPU, and the computer program may be stored in a computer-readable storage medium. When the computer program is executed by the CPU, the above-mentioned functions defined in the method of the present disclosure are executed.

In addition, the above method steps and system units may also be implemented by using a controller and a computer-readable storage medium for storing a computer program that causes the controller to implement the above steps or unit functions.

In addition, it should be understood that the computer-readable storage medium (such as a memory) described herein may be a transitory memory or a non-transitory memory, or may include both transitory memory and non-transitory memory. By way of example and not limitation, the non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM), which may act as an external cache memory. By way of example and not limitation, the RAM may be obtained in various forms, such as a synchronous RAM (SRAM), a dynamic RAM (DRAM), a synchronous dynamic DRAM (SDRAM), a double data rate SDRAM (DDR SDRAM), an enhanced SDRAM (ESDRAM), a synchronous link DRAM (SLDRAM), and a direct RambusRAM (DRRAM). The storage devices of the disclosed aspects are intended to include, but are not limited to these and other suitable types of memory.

Those skilled in the art may also understand that the various exemplary logic blocks, modules, circuits, and algorithm steps described in conjunction with the disclosure herein may be implemented as electronic hardware, computer software, or a combination of both. In order to clearly illustrate this interchangeability of hardware and software, functions of various illustrative components, blocks, modules, circuits, and steps have been described in general terms. Whether these functions are implemented as software or hardware depends on specific applications and design constraints imposed on the entire system. Those skilled in the art may implement the described functions in various ways for each specific application, but such implementation should not be interpreted as causing a departure from the scope of the present disclosure.

The various exemplary logic blocks, modules and circuits described in conjunction with the disclosure herein may be implemented or executed using the following components designed to perform the functions described herein: a general-purpose processor, a digital signal processor (DSP), an application specific integrated circuit (ASIC), a field programmable gate array (FPGA) or other programmable logic device, discrete gate or transistor logic, discrete hardware components, or any combination of these components. The general-purpose processor may be a microprocessor, but in the alternative, the processor may be any conventional processor, controller, microcontroller, or state machine. The processor may also be implemented as a combination of computing devices, for example, a combination of a DSP and a microprocessor, multiple microprocessors, one or more microprocessors combined with a DSP core, or any other such configuration.

The steps of the method or algorithm described in combination with the disclosure herein may be directly included in hardware, a software module executed by a processor, or a combination of the two. The software module may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to the processor such that the processor may read information from or write information to the storage medium. In an alternative scheme, the storage medium may be integrated with the processor. The processor and the storage medium may reside in the ASIC. The ASIC may reside in the user terminal. In an alternative solution, the processor and the storage medium may reside as discrete components in the user terminal.

In one or more exemplary designs, the functions described may be implemented in hardware, software, firmware, or any combination thereof. If implemented in software, the functions may be stored as one or more instructions or codes on a computer-readable medium or transmitted through the computer-readable medium. The computer-readable medium includes a computer storage medium and a communication medium. The communication medium includes any medium that facilitates a transfer of a computer program from one location to another location. The storage medium may be any available medium that may be accessed by a general-purpose or special-purpose computer. By way of example and not limitation, the computer-readable medium may include RAM, ROM, EEPROM, CD-ROM or other optical disk storage devices, magnetic disk storage devices or other magnetic storage devices, or any other medium that may be used for carrying or storing required program code in the form of instructions or data structure and may be accessed by a general-purpose or special-purpose computer or a general-purpose or special-purpose processor. In addition, any connection may be properly called a computer-readable medium. For example, if a coaxial cable, a fiber optic cable, a twisted pair, a digital subscriber line (DSL), or wireless technologies such as infrared, radio and microwave are used to transmit software from a website, server or other remote source, the above-mentioned coaxial cable, fiber optic cable, twisted pair, DSL or wireless technologies such as infrared, radio and microwave are all contained in the definition of medium. As used herein, the magnetic disk and the optical disk includes compact disk (CD), laser disk, optical disk, digital versatile disk (DVD), floppy disk, and Blu-ray disk. The magnetic disk usually reproduces data magnetically, while the optical disk optically reproduces data by using laser. Combinations of the above contents should also be included in the scope of the computer-readable medium.

It should be noted that various changes and modifications may be made to the exemplary embodiments of the present disclosure without departing from the scope of the present disclosure defined by the claims. The functions, steps and/or actions of the method claims according to the disclosed embodiments described herein do not need to be executed in any specific order. In addition, although the elements of the present disclosure may be described or required in an individual form, a plurality may also be envisaged, unless explicitly limited to a singular.

It should be understood that the singular form "a" as used herein is intended to also include the plural form, unless the context clearly supports an exception. It should also be understood that "and/or" as used herein refers to any and all possible combinations including one or more items listed in association.

The sequence numbers of the above-mentioned embodiments of the present disclosure are only for description, and do not represent good and bad of the embodiments.

Those ordinary skilled in the art may understand that all or part of the steps in the above-mentioned embodiments may be implemented by hardware, or by a program instructing related hardware. The program may be stored in a computer-readable storage medium. The storage medium mentioned above may be a read-only memory, a magnetic disk or an optical disk, etc.

Those ordinary skilled in the art should understand that the discussion of any of the above embodiments is only exemplary, and is not intended to imply that the scope of the present disclosure (including the claims) is limited to these examples. Under the idea of the embodiments of the present disclosure, the embodiments or the technical features in different embodiments may also be combined, and there are many other changes in different aspects of the embodiments of the present disclosure as described above. For brevity, they are not provided in details. Therefore, any omissions, modifications, equivalent replacements, improvements, etc. made within the spirit and principle of the embodiments of the present disclosure should be included in the protection scope of the embodiments of the present disclosure.

What is claimed is:

1. A positioning method of a target node in a wireless ad hoc network, comprising:
    performing an initial positioning to obtain a first positioning result for the target node;
    determining, based on the first positioning result and a second positioning result for an other node in the wireless ad hoc network, whether a positioning error exists in the first positioning result or not, wherein the second positioning result at least contains an accurate second positioning result; and
    calculating a third positioning result for the target node based on the accurate second positioning result, in response to determining a positioning error exists in the first positioning result.

2. The positioning method of claim 1, wherein the calculating a third positioning result for the target node based on the accurate second positioning result comprises:
- measuring a first distance, wherein the first distance is a point-to-point distance between the target node and an other node in the wireless ad hoc network;
- receiving, from the other node, a cumulative hop distance of a minimum hop path between the other node and an anchor node, wherein the anchor node is a node associated with the accurate second positioning result;
- deriving a second distance between the target node and the anchor node based on the first distance and the cumulative hop distance of the minimum hop path between the other node and the anchor node, wherein the second distance is a cumulative hop distance of a minimum hop path between the target node and the anchor node; and
- calculating a third positioning result for the target node based on at least two second distances to at least two anchor nodes and second positioning results for the at least two anchor nodes.

3. The positioning method of claim 2, wherein the calculating a third positioning result for the target node based on at least two second distances to at least two anchor nodes and second positioning results for the at least two anchor nodes comprises:
- approximating the second distance to a respective Euclidean distance between the target node and the anchor node, so as to calculate the third positioning result for the target node.

4. The positioning method of claim 2, wherein the calculating a third positioning result comprises: calculating the third positioning result by using a trilateration method or a maximum likelihood method.

5. The positioning method of claim 2, wherein the measuring a first distance comprises: measuring the first distance by using a received signal strength indication method.

6. The positioning method of claim 2, wherein the cumulative hop distance is propagated by the other node using a distance vector routing method.

7. The positioning method of claim 1, wherein the determining, based on the first positioning result and a second positioning result for an other node in the wireless ad hoc network, whether a positioning error exists in the first positioning result or not comprises:
- transmitting a wireless signal at a first transmission power to determine a first node communicable with the target node;
- transmitting a wireless signal at a second transmission power to determine a second node communicable with the target node, wherein a communication range of the second transmission power is different from a communication range of the first transmission power;
- determining a third distance between the target node and the first node as well as a fourth distance between the target node and the second node, based on the communication range of the first transmission power and the communication range of the second transmission power; and
- determining, based on the third distance, the fourth distance, the first positioning result, the second positioning result for the first node, and the second positioning result for the second node, whether a positioning error exists in the first positioning result or not.

8. The positioning method of claim 1, wherein the performing an initial positioning to obtain a first positioning result for the target node comprises:
- performing the initial positioning by using a GPS positioning method to obtain the first positioning result for the target node.

9. A positioning apparatus of a target node in a wireless ad hoc network, comprising: an initial positioning module configured to perform an initial positioning to obtain a first positioning result for the target node;
- a positioning error determination module configured to determine, based on the first positioning result and a second positioning result for an other node in the wireless ad hoc network, whether a positioning error exists in the first positioning result or not, wherein the second positioning result at least contains an accurate second positioning result; and
- a positioning error correction module configured to calculate a third positioning result for the target node based on the accurate second positioning result, in response to determining a positioning error exists in the first positioning result.

10. The positioning apparatus of claim 9, wherein the positioning error correction module is further configured to:
- measure a first distance, wherein the first distance is a point-to-point distance between the target node and an other node in the wireless ad hoc network;
- receive, from the other node, a cumulative hop distance of a minimum hop path between the other node and an anchor node, wherein the anchor node is a node associated with the accurate second positioning result;
- derive a second distance between the target node and the anchor node based on the first distance and the cumulative hop distance of the minimum hop path between the other node and the anchor node, wherein the second distance is a cumulative hop distance of a minimum hop path between the target node and the anchor node; and
- calculating a third positioning result for the target node based on at least two second distances to at least two anchor nodes and second positioning results for the at least two anchor nodes.

11. The positioning apparatus of claim 9, wherein the positioning error determination module is further configured to:
- transmit a wireless signal at a first transmission power to determine a first node communicable with the target node;
- transmit a wireless signal at a second transmission power to determine a second node communicable with the target node, wherein a communication range of the second transmission power is different from a communication range of the first transmission power;
- determine a third distance between the target node and the first node as well as a fourth distance between the target node and the second node, based on the communication range of the first transmission power and the communication range of the second transmission power; and
- determine, based on the third distance, the fourth distance, the first positioning result, the second positioning result for the first node, and the second positioning result for the second node, whether a positioning error exists in the first positioning result or not.

12. An electronic device, comprising:
at least one processor; and
a memory communicatively connected to the at least one processor, wherein the memory stores instructions executable by the at least one processor, and the instructions, when executed by the at least one processor, cause the at least one processor to implement the positioning method of claim 1.

13. A non-transitory computer-readable storage medium having a computer program stored thereon, wherein the computer program, when executed by a processor, causes the processor to implement the method of claim 1.

\* \* \* \* \*